United States Patent
Choi (10) Patent No.: US 7,725,550 B2
(45) Date of Patent: May 25, 2010

(54) SYSTEM AND METHOD FOR FILTERING MESSAGE

(75) Inventor: Sung-Wone Choi, Seoul (KR)

(73) Assignee: NHN Corporation, Seongnam-si (KR)

( * ) Notice: Subject to any disclaimer, the term of this patent is extended or adjusted under 35 U.S.C. 154(b) by 176 days.

(21) Appl. No.: 11/793,373

(22) PCT Filed: Dec. 16, 2005

(86) PCT No.: PCT/KR2005/004366

§ 371 (c)(1),
(2), (4) Date: Apr. 10, 2008

(87) PCT Pub. No.: WO2006/065108

PCT Pub. Date: Jun. 22, 2006

(65) Prior Publication Data

US 2008/0263159 A1 Oct. 23, 2008

(30) Foreign Application Priority Data

Dec. 17, 2004 (KR) ........................ 10-2004-0107989
Dec. 17, 2004 (KR) ........................ 10-2004-0108260

(51) Int. Cl.
*G06F 15/16* (2006.01)
(52) U.S. Cl. ........................ 709/206; 709/217
(58) Field of Classification Search ......... 709/200–206, 709/217–219
See application file for complete search history.

(56) References Cited

U.S. PATENT DOCUMENTS

| | | | |
|---|---|---|---|
| 7,058,684 B1 * | 6/2006 | Ueda | 709/206 |
| 7,483,947 B2 * | 1/2009 | Starbuck et al. | 709/206 |
| 7,555,523 B1 * | 6/2009 | Hartmann | 709/206 |
| 7,620,690 B1 * | 11/2009 | Castelli | 709/206 |
| 2004/0015554 A1 * | 1/2004 | Wilson | 709/206 |
| 2004/0221062 A1 * | 11/2004 | Starbuck et al. | 709/246 |
| 2005/0144241 A1 * | 6/2005 | Stata et al. | 709/206 |
| 2006/0031318 A1 * | 2/2006 | Gellens | 709/206 |
| 2006/0047768 A1 * | 3/2006 | Gellens | 709/207 |
| 2007/0130350 A1 * | 6/2007 | Alperovitch et al. | 709/229 |
| 2008/0104062 A1 * | 5/2008 | Oliver et al. | 707/5 |
| 2008/0104712 A1 * | 5/2008 | Oliver et al. | 726/27 |

FOREIGN PATENT DOCUMENTS

| | | |
|---|---|---|
| JP | 08-314947 | 11/1996 |
| KR | 10-2000-0041817 A | 7/2000 |
| KR | 10-2001-0067853 A | 7/2001 |
| KR | 10-2003-0086425 A | 11/2003 |

* cited by examiner

*Primary Examiner*—Moustafa M Meky
(74) *Attorney, Agent, or Firm*—H.C. Park & Associates, PLC (57) ABSTRACT

A system and method for message filtering are disclosed. A conversion target letter table is generated which stores information on letters that may be used to elude filtering, the table storing the hex code information of each letter that may be used for eluding filtering and the conversion letter information regarding the conversion letter to which each letter is to be converted. A hex code of a message text inputted by a user is compared with the hex codes of the table, and when a conversion target letter is included, it is converted to the conversion letter stored in the conversion target table associated with the letter. When the conversion is completed, it is determined whether or not pre-configured prohibited words are included in the converted message; and message filtering is performed.

13 Claims, 10 Drawing Sheets

SYSTEM AND METHOD FOR FILTERING MESSAGE

CROSS-REFERENCES TO RELATED APPLICATIONS

This application is a U.S. national phase application, pursuant to 35 U.S.C. §371, of PCT international application Ser. No. PCT/KR2005/004366, filed Dec. 16, 2005, designating the United States and published in English on Jun. 22, 2006 as publication WO 2006/065108 A1, which claims priority to Korean Patent Application Nos. 10-2004-0108260, filed Dec. 17, 2004 and 10-2004-0107989, filed Dec. 17, 2004. The entire contents of the aforementioned patent applications are incorporated herein by this reference.

FIELD OF THE INVENTION

The present invention relates to a method, a system and a mobile terminal for filtering messages transmitted over a network, which have been modified to elude a prohibited word or words.

BACKGROUND OF THE INVENTION

With the development of the Internet, it has become quite convenient for users to exchange messages over the Internet. Users can exchange various forms of messages through memo, chatting, messenger, and mail functions, etc., and the exchange of messages has become an essential feature in community websites and online games.

Although message transfer services are provided for users to exchange ideas, the number of occurrences is increasing in which these services are abused, at the cost of the users or the service providers.

For example, such cases may include obscene messages transferred to random users, and transaction messages sent to users to exchange game money obtained through hacking for cash.

In prior art, such spam messages were generally filtered using string matching methods. For instance, if 'money' was selected as a prohibited word to block the exchange of game money through messages, those messages which include the text 'money' were blocked. String matching is an algorithm based on artificial intelligence, and various string matching methods have been disclosed to date.

However, the number of spam message transmissions has increased, in which special characters such as symbols are used to elude string matching message filtering.

Figure 1:
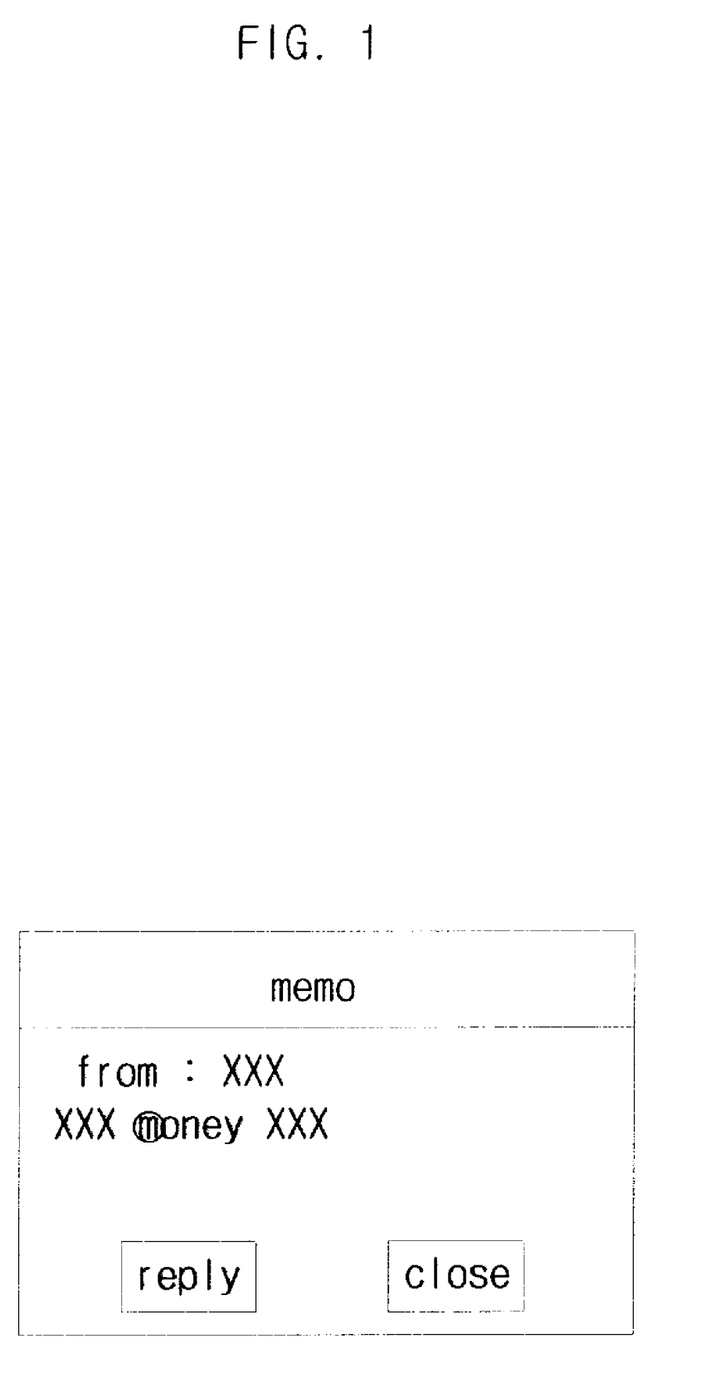
FIG. 1 illustrates an example of a message that uses symbols to elude string matching.

FIG. 1 illustrates an example of a message that uses symbols to elude string matching, and as in FIG. 1, symbols such as 'ⓜ' and 'ⓝ' are used to edit a letter sequence that can be discerned as the prohibited word 'money', whereby the number of occurrences is increasing in which messages that include prohibited words are transmitted.

These special characters can be used in combination with regular letters to form various letter sequences, and besides symbols, foreign letters known to the public can also be used to form words corresponding to the prohibited words. Thus, it is impossible to perform filtering for these words in actuality using the conventional string matching method.

SUMMARY OF THE INVENTION

As a solution to problems of the prior art stated above, an object of the present invention is to provide a method that can perform filtering for letter sequences which have been specially edited to elude string matching filtering.

Another object of the invention is to provide a method of filtering messages that elude keyword filtering using the hex code of the message text.

One aspect of the invention provides a method of filtering messages, comprising the steps of: (a) generating a conversion target letter table which stores hex code information corresponding to each conversion target letter that may be used for eluding filtering and conversion letters corresponding to each of the conversion target letters; (b) comparing a hex code of a letter of a message text in putted by a user with the hex code information stored in the conversion target letter table; (c) when the hex code matches any one of the hex code information stored in the conversion target letter table, converting the letter to the corresponding conversion letter stored in the conversion target letter table; (d) repeating the steps (b) and (c) for all of letters of the message text so as to create a converted message text; and (e) when a pre-configured prohibited word or words are included in the converted message text, filtering the converted message text.

The message text may include at least one selected from the group consisting of a memo message, an instant message, a mail message, and a message post for a bulletin board.

The letters for eluding filtering stored in the conversion target letter table may include at least one selected from the group consisting of symbols, phonetic signs, and loanwords.

To determine whether or not pre-configured a prohibited word or words are included, string matching may be performed.

When the message text is a memo message, an instant message or a mail message, the filtering comprises blocking the transmission of the message text to a specified user.

When the message text is a message post for a bulletin board, the filtering comprises blocking the registration of the message text on the bulletin board.

When the message text is a mail message, the steps (b) and (c) are performed on the title of the mail message or the content of the mail message, and the filtering comprises blocking storage of the mail message in a mail box or storing the mail message in a spam mail folder.

Another aspect of the invention provides a message filtering system, comprising: a conversion target letter table for storing hex code information corresponding to each conversion target letter that may be used for eluding filtering and conversion letters corresponding to each of the conversion target letters; a character matching module for comparing a hex code of letter of a message text inputted by a user with the hex code information stored in the conversion target letter table; a letter conversion module for converting, when the hex code matches any one of the hex code information stored in the conversion target letter table, the letter to the corresponding conversion letter stored in the conversion target letter table so as to create a converted message text; and a filtering module for filtering, when a pre-configured prohibited word or words are included in the converted message text, the converted message text.

Yet another aspect of the invention provides a mobile terminal which performs filtering for short messages edited using special characters, comprising: a conversion target letter table for storing hex code information corresponding to each conversion target letter that may be used for eluding filtering and conversion letters corresponding to each of the conversion target letters; a character matching module for comparing a hex code of letter of a message text inputted by a user with the hex code information stored in the conversion target letter table; a letter conversion module for converting, when the hex code matches any one of the hex code information stored in the conversion target letter table, the letter to the corresponding conversion letter stored in the conversion target letter table so as to create a converted message text; and a filtering module for filtering, when a pre-configured prohibited word or words are included in the converted message text, the converted message text.

Still another aspect of the invention provides a method of filtering short messages in a mobile communication system at a short message service center, comprising the steps of: (a) generating a conversion target letter table which stores hex code information corresponding to each conversion target letter that may be used for eluding filtering and conversion letters corresponding to each of the conversion target letters; (b) comparing a hex code of a letter of a message text inputted by a user with the hex code information stored in the conversion target letter table; (c) when the hex code matches any one of the hex code information stored in the conversion target letter table, converting the letter to the corresponding conversion letter stored in the conversion target letter table; (d) repeating the steps (b) and (c) for all of letters of the message text so as to create a converted message text; and (e) when a pre-configured prohibited word or words are included in the converted message text, filtering the converted message text.

DETAILED DESCRIPTION OF THE PREFERRED EMBODIMENTS

Hereinafter, embodiments of the invention will be described in more detail with reference to the accompanying drawings.

Figure 2:
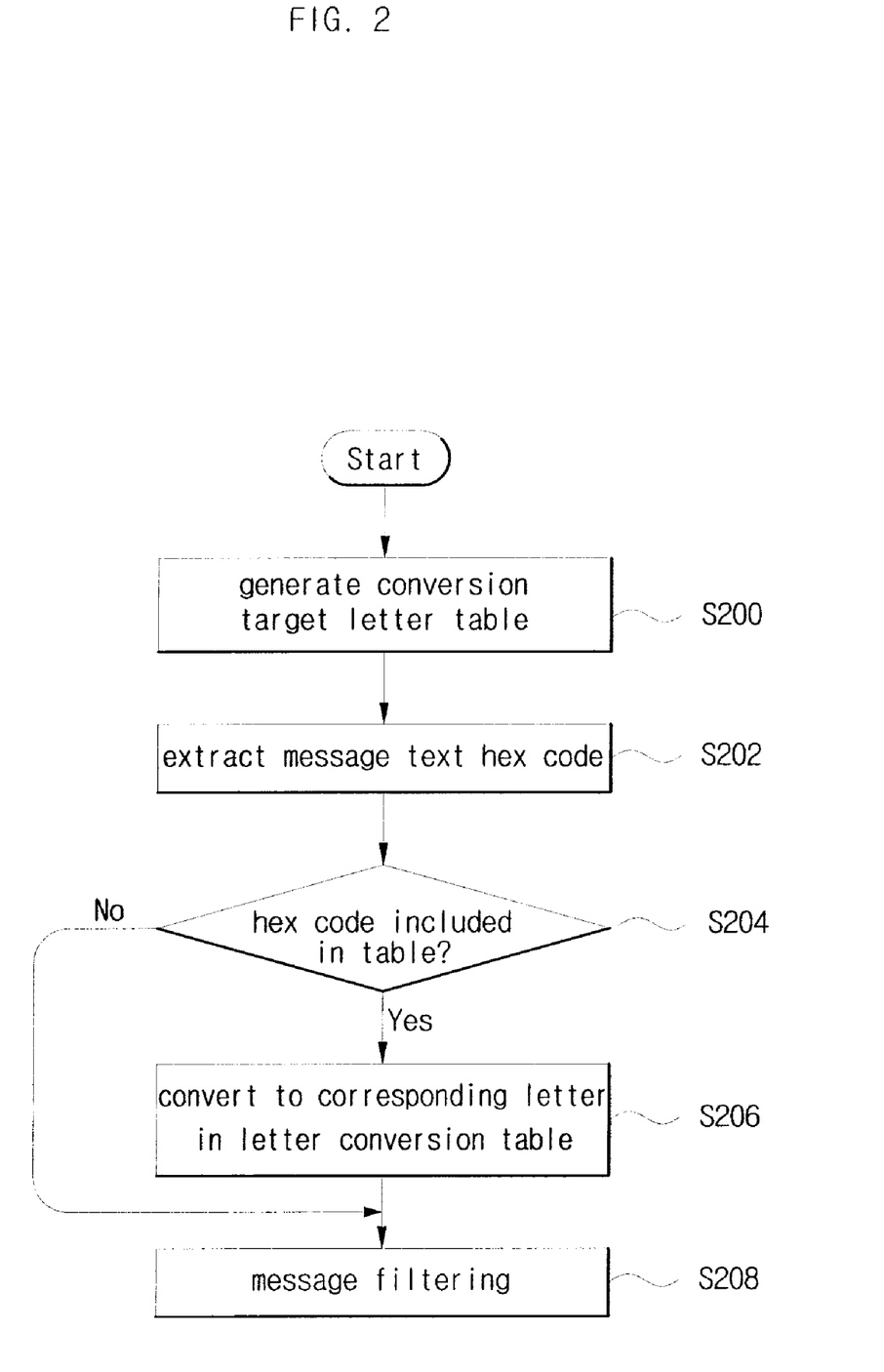
FIG. 2 is an overall flowchart of a message filtering method based on a preferred embodiment of the present invention.

FIG. 2 is an overall flowchart of a message filtering method based on a preferred embodiment of the present invention.

Referring to FIG. 2, a conversion target letter table is first generated, including information on letters that may be used for eluding a prohibited word or words (step 200). The conversion target letter table includes not only the information on letters that may be used for eluding a prohibited word or words but also information on letters to which the corresponding letters are to be converted. For example, since 'ⓜ' may be used to elude the regular letter 'm', the information is also included which indicates that 'ⓜ' is converted to 'm'. Further, the hex code information of the conversion target letters is also included in the conversion target letter table. That is, the conversion target letter table includes the hex code information of letters that are targets for conversion and the letter information regarding the letters to which the conversion target letters are to be converted. The list of conversion target letters may continuously be updated according to the message editing styles of the users.

When a user transmits a message, the hex code data of the message text is extracted (step 202). Here, the message may include a memo message, an instant message, and a mail message, etc., as well as a message post on a bulletin board, etc. Further, not only the message transmitted over a data communication network, but also a short message transmitted over a mobile communication network may also be included. In conventional filtering methods, the text of the message is compared with pre-configured prohibited words, without the use of the hex code data of the message text in the message filtering. The present invention, however, uses the hex code of the message text to prevent the eluding of filtering using letters for eluding filtering such as special characters.

After extracting the hex code of the message text, it is determined whether or not at least one or more hex codes of the message text match the hex codes in the pre-configured conversion target letter table (step 204). This is to determine whether or not letters such as special characters that are targets for conversion have been included in the message to elude filtering.

When at least one hex code of the message text matches the hex code of the pre-configured conversion target letter table, the corresponding conversion target letter is converted based on the information in the conversion target letter table (step 206).

For example, consider the case where the language used is English, and a user has transmitted the message 'ⓜoney'. The conversion target letter table contains the information that 'ⓜ' is to be converted to 'm', whereby 'ⓜ' is converted to 'm' and the message 'ⓜmoney' is converted to 'money'.

The present invention may be applied not only to English, but also to a variety of languages, for instance, Japanese and Chinese, etc.

In Japanese, for example, when 'おかね' is configured to be a prohibited word, a user may generate and transmit the message 'Oかね' to elude filtering. Here, the hex code related to the special character 'O' is stored in the conversion target letter table, as well as the information that 'O' is to be converted to 'お'. Thus, 'O' is converted to 'お', and the message 'Oかね' is converted to 'おかね'.

A combination of multiple letters may be included in the conversion target letters, instead of just one letter. For example, consider the case in Chinese where "錢" is configured to be a prohibited word. Here, a user may use the phonetic notation of 'qian' instead of "錢" to elude filtering. In this case, the hex codes of the letter combination 'qian' are stored in the conversion target letter table, as well as the information that 'qian' is to be converted to "錢".

When the conversion target letters have been converted using the information in the conversion target letter table, filtering is performed for the converted message (step 208). If 'money' is a prohibited word and 'ⓜoney' is converted to 'money' in step 206, the 'money' included in the message will be filtered.

Figure 3:
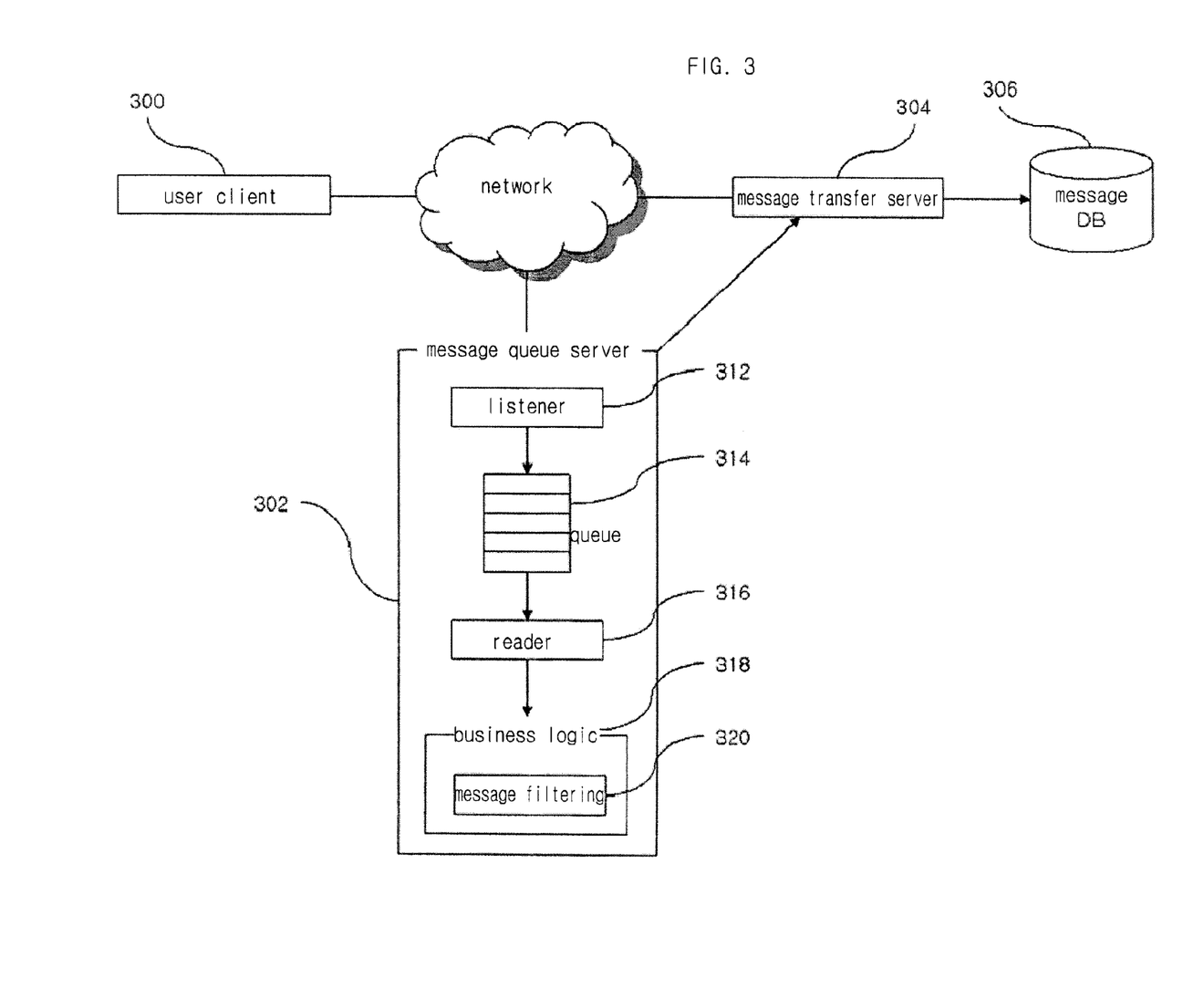
FIG. 3 illustrates an example of a system in which a message filtering method based on the present invention may be used.

FIG. 3 illustrates an example of a system in which a message filtering method based on the present invention may be used.

Referring to FIG. 3, a system using a message filtering method based on the present invention may comprise a message queue server 302 comprising a listener 312, queue 314, reader 316, and business logic module 318; a message transfer server 304; and message database 306.

The system of FIG. 3 (other names may be used while performing the same functions) illustrates a system for transferring messages, and the present invention may be used to block the transfer of memo messages that use letters for eluding filtering. FIG. 3 shows an example of a memo transfer system, and it will be apparent to the skilled person that a method based on the invention may be applied to other memo transfer systems with different structures from that shown in FIG. 3.

As shown in FIG. 3, when a user transmits a memo message via a user client to another user, the message is transmitted to the listener 312 of the message queue server 302, where the listener stores the transmitted message in the queue 314.

The reader 316 retrieves the memo messages stored in the queue on a FIFO basis and supplies them to the business logic module 318.

The business logic module 318 concerns a logic performing supplementary functions related to processing memo messages, and filtering forbidden messages is also performed by the business logic module 318. The message filtering module 320 comprised in the business logic module 318 converts letters that are targets for conversion according to the conversion target letter table and performs filtering, following a process such as that shown in FIG. 2.

If the message filtering module 320 determines that the message does not need to be filtered, the corresponding memo message is transmitted to the message transfer server 304 and stored in the message database 306. When a user corresponding to the receiver of the memo later requests the memo message, the message transfer server loads the corresponding memo message data from the message database and transfers the message.

If the message filtering module 320 determines that the message needs to be filtered, the corresponding memo message is not transmitted to the message transfer server 304.

Figure 4:
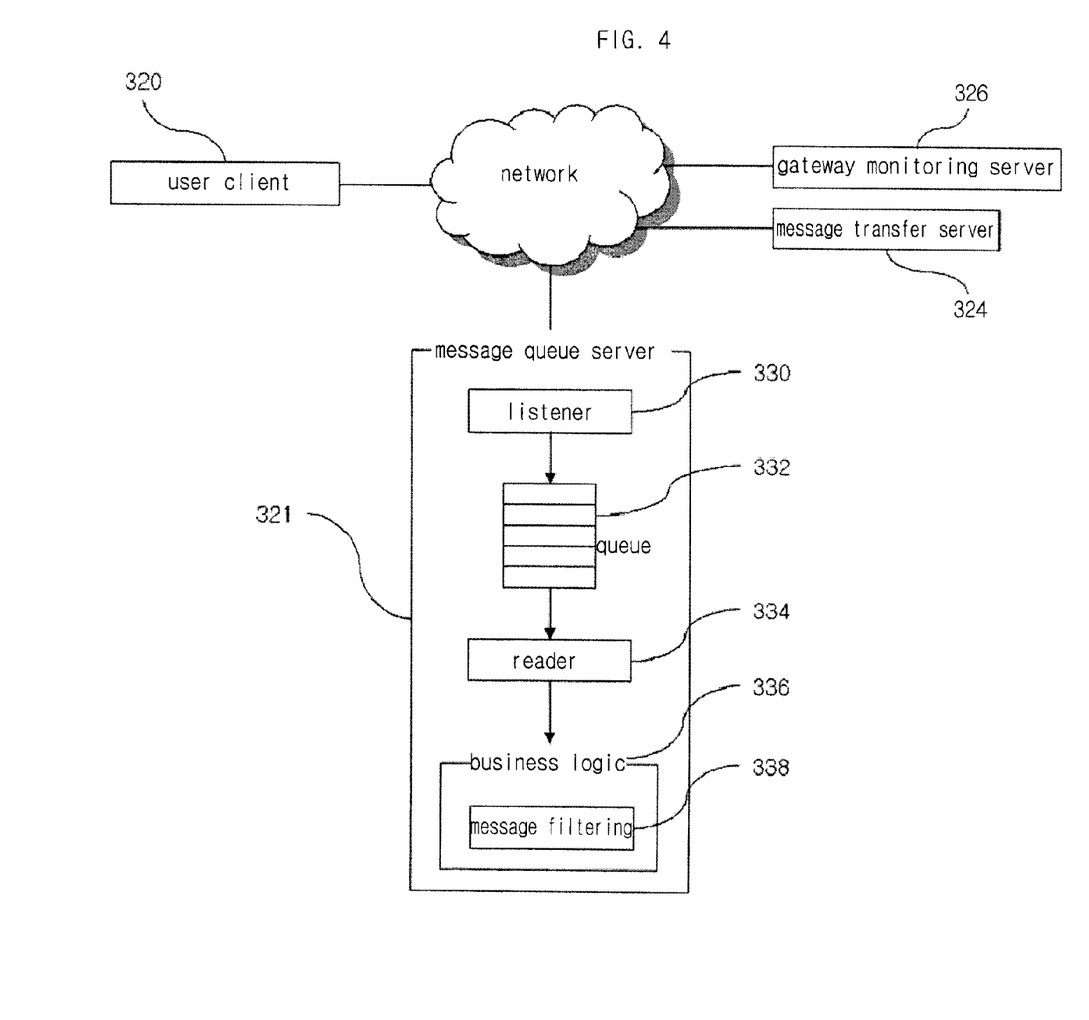
FIG. 4 illustrates another example of a system in which a message filtering method based on the present invention may be used.

FIG. 4 illustrates another example of a system in which a message filtering method based on the present invention may be used.

Referring to FIG. 4, a system using a message filtering method based on the present invention may comprise a message queue server 321 comprising a listener 330, queue 332, reader 334, and business logic module 336; a message transfer server 324; and a gateway monitoring server 326.

The system of FIG. 4 illustrates a system for transferring instant messages, such as in messenger services, where a filtering method based on the present invention may be used for the instant messages transmitted via a messenger.

As shown in FIG. 4, when a user transmits an instant message via a messenger to another user, the message is transmitted to the listener 330 of the message queue server 321, where the listener stores the transmitted message in the queue 332.

The reader 334 retrieves the instant messages stored in the queue on a FIFO basis and supplies them to the business logic module 336.

The message filtering module 338 comprised in the business logic module 336 converts letters that are targets for conversion according to the conversion target letter table and performs filtering, following a process such as that shown in FIG. 2.

If the message filtering module 338 determines that the message does not need to be filtered, the corresponding instant message is transmitted to the message transfer server 324, and the message transfer server 324 transmits the instant message to the corresponding user. The gateway monitoring server 326 performs the function of managing user log-ins and user status information. Although it is not shown in FIG. 4, a database may be connected to the message transfer server to store messages exchanged between users.

If the message filtering module 338 determines that the message needs to be filtered, the corresponding instant message is not transmitted to the message transfer server 324. Nevertheless, the filtered message may, while not being transmitted to a user, only be stored in a database.

Figure 5:
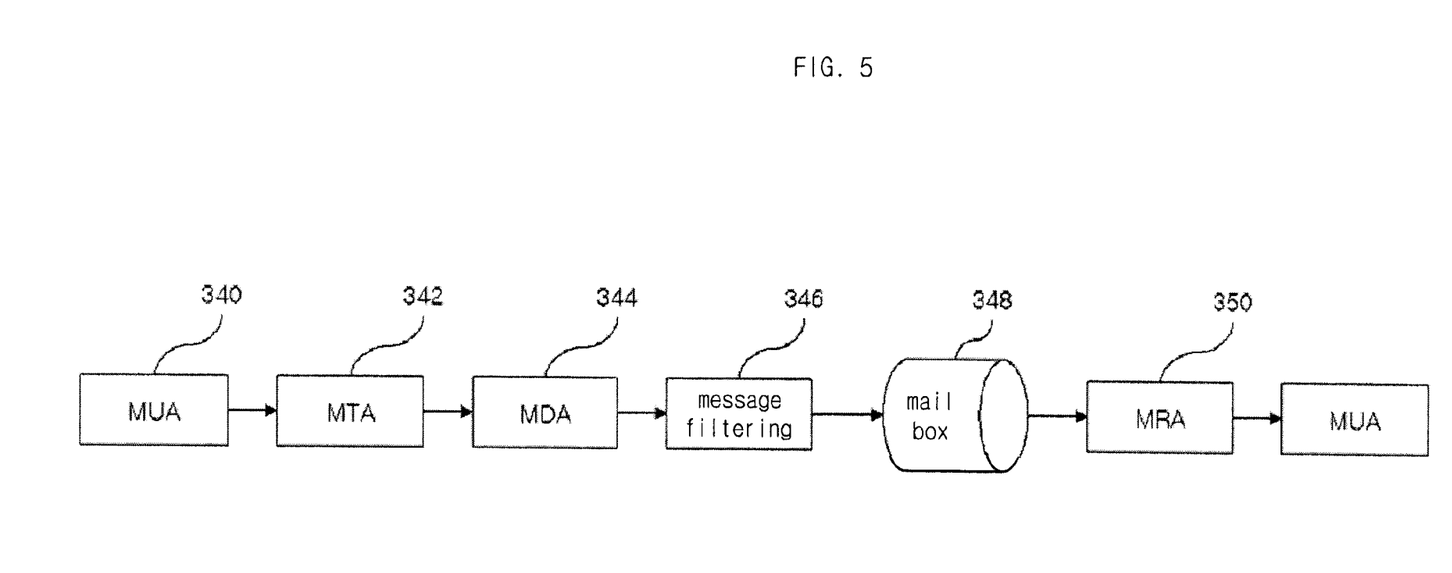
FIG. 5 illustrates still another example of a system in which a message filtering method based on the present invention may be utilized.

FIG. 5 illustrates still another example of a system in which a message filtering method based on the present invention may be utilized.

The system of FIG. 5 is for filtering mail messages, and referring to FIG. 5, comprises a MUA 340, MTA 342, MDA 344, message filtering module 346, mail box 348 and MRA 350.

The MUA (Mail User Agent) 340 is a client program used by the user to exchange e-mail. In the case of web mail, where the e-mail is viewed from a remote mail system via protocols such as POP and IMAP, etc., an Internet browser is generally used as the MUA. Other mail browser programs such as Microsoft's Outlook Express and Netscape's Netscape Mail may also be included as the MUA.

The MTA (Mail Transfer Agent) 342 receives e-mail via the SMTP (Simple Mail Transfer Protocol) communication standard. That is, the MTA 342 calls and instructs the MDA (Mail Delivery Agent) 344 to transmit e-mail, received from another MTA or the MUA, to another MTA or to transfer the e-mail to the user's mail box 348.

The MDA 344 transfers the e-mail received by the MTA 342 to the actual user, where the e-mail may be transferred internally or externally. In the case of external transfers, a MDA exists for each channel. In the case of internal transfers, the received e-mail is stored in the mail box of each user.

The mail box 348 is a database for storing e-mail, for which one type (MBOX) involves continuously adding to a single file and another type involves storing each case of e-mail as an individual file in a directory. The MBOX type is currently the most widely used.

The MRA (Mail Retrieval Agent) 350 is a program that allows a user to view e-mail from an exterior location, and includes POP3 daemons and IMAP4 daemons, etc.

The message filtering module 346 may be positioned before the mail box 348, and converts letters that are targets for conversion according to the conversion target letter table and performs filtering, following a process such as that shown in FIG. 2. The message filtering module 346 may perform filtering for the mail message scanning only the title field of the mail, or may perform filtering for the mail message scanning the content of the mail.

Although FIG. 5 depicts the case where the message filtering module is equipped separately, it will be apparent to the skilled person that the message filtering module may be comprised in the MDA 344.

If the message filtering module 346 determines that the message does not need to be filtered, the mail message is stored in the mail box 348.

If the message filtering module 346 determines that the message needs to be filtered, the corresponding mail message may be made not to be stored in the mail box. Nevertheless, the corresponding mail message may be stored in the spam mail folder of the mail box.

Figure 6:
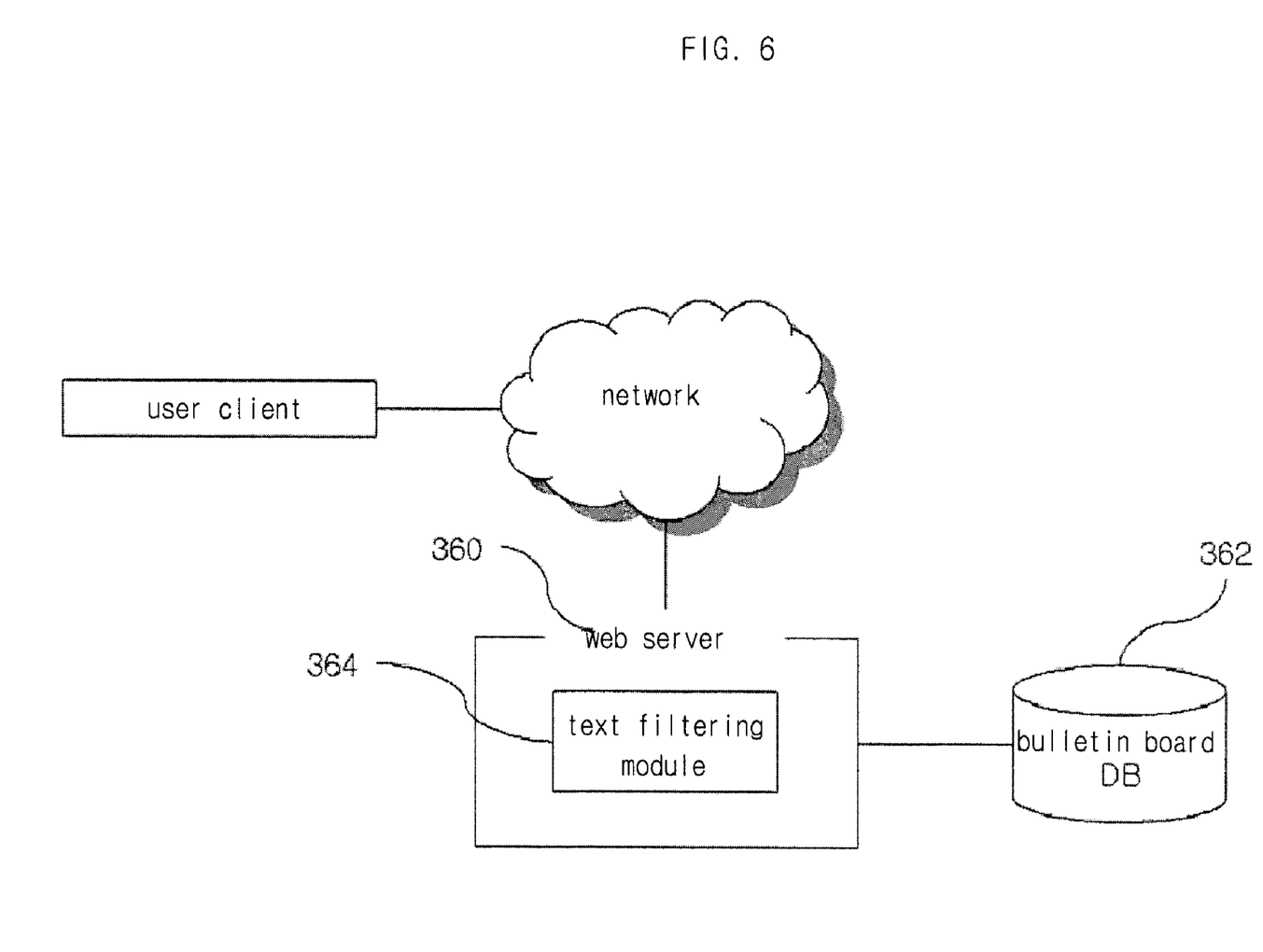
FIG. 6 illustrates yet another example of a system in which a message filtering method based on the present invention may be utilized.

FIG. 6 illustrates yet another example of a system in which a message filtering method based on the present invention may be utilized.

The system of FIG. 6 is for filtering message posts on a bulletin board, where special characters are used to form significant letters, and as shown in FIG. 6, may comprise a web server 360 and a bulletin board database 362.

A user edits a message post through a web page provided by the web server 360, and the edited message post information is transmitted to the web server 360.

The text filtering module 364 of the web server 360 performs a process such as that shown in FIG. 2 with regard to the message post text submitted by the user.

If the message filtering module determines that the message post does not need to be filtered, the message post edited by the user is stored in the bulletin board database 362. However, if the message post needs to be filtered, the web server denies registration for the corresponding message post.

Although FIGS. 3 to 6 have described systems to which message filtering methods based on the present invention may be applied, the systems in which the methods of the invention may be used are not limited to the systems of FIGS. 3 to 6, and it will be apparent to the skilled person that the invention may be applied to service systems which transfer messages in the form of letters, besides the service systems of FIGS. 3 to 6. For example, the invention may also be applied to chatting message systems, especially those chatting message systems which provide not only regular chatting but also chatting message transfers during a game.

Also, although FIGS. 3 to 6 have illustrated the cases wherein the filtering, as shown in FIG. 2, is performed within each system, the filtering based on the present invention may be performed in the user client groups which transfer the messages.

Moreover, the filtering method based on the invention may be applied not only to data communication networks but also to short message filtering in mobile communication systems.

Figure 7:
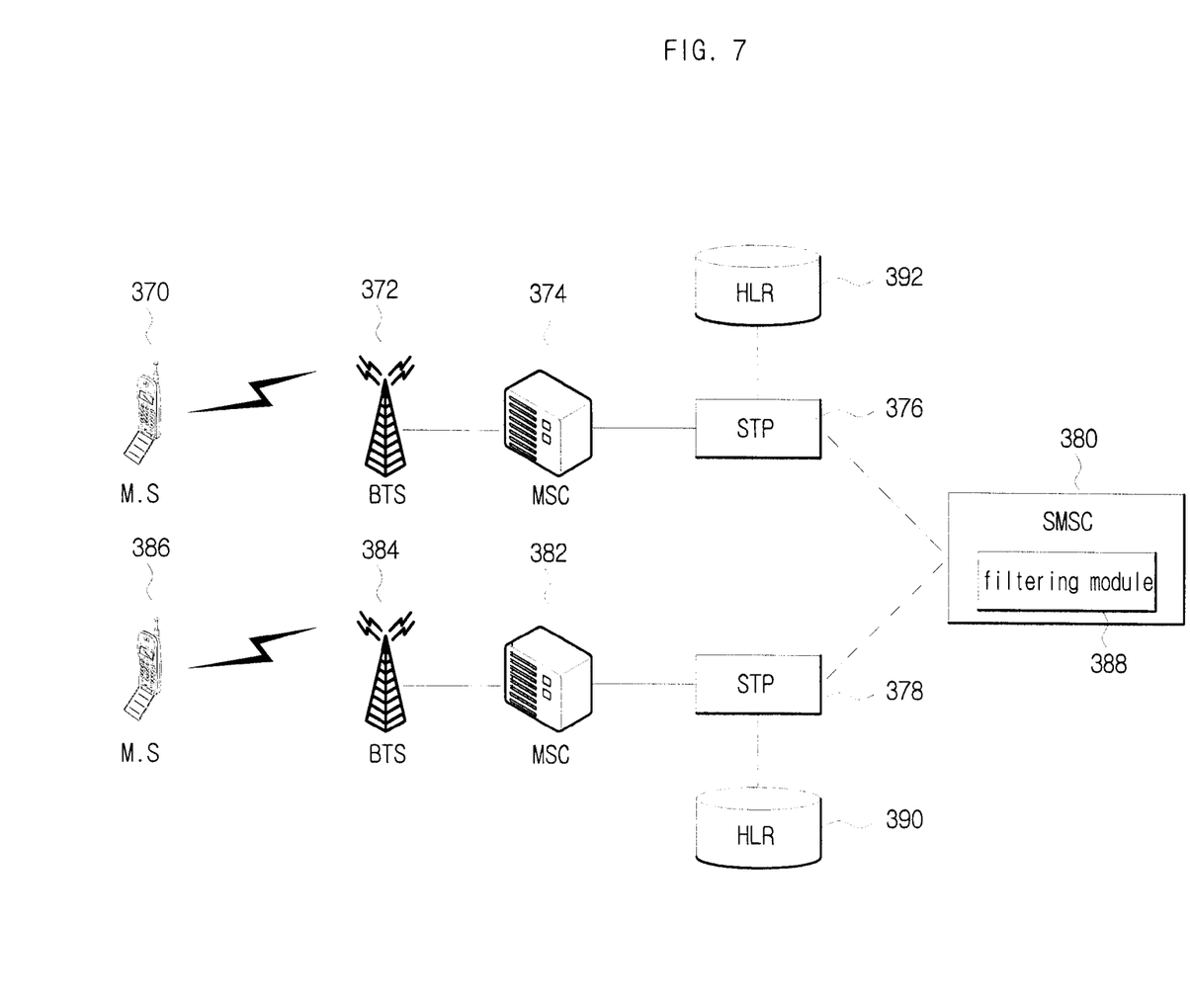
FIG. 7 illustrates an example of a mobile communication system in which a message filtering method based on the present invention may be used.

FIG. 7 illustrates an example of a mobile communication system in which a message filtering method based on the present invention may be used.

Referring to FIG. 7, a system in which a message filtering method based on the present invention may comprise mobile terminals 370, 386, base transceiver stations 372, 384, mobile switching centers 374, 382, signal transfer points 376, 378, and a short message service center 380.

As shown in FIG. 7, the mobile terminals 370, 386 transmit short messages edited by the users to the base transceiver stations 372, 384 or receive short messages from the base transceiver stations 372, 384. The mobile terminals 370, 386 may include all forms of terminals that allow wireless communication, such as a typical portable phones, as well as PDA's, and portable laptops.

The base transceiver stations 372, 384 process functions related to the transmission of wireless signals between the mobile switching centers 374, 382 and the mobile terminals 370, 386. A short message wireless signal created by a user is first transmitted to a base transceiver station 372, 384, and the base transceiver station transfers the received signal to a mobile switching center 374, 382. Although it is not shown in FIG. 3, base transceiver station controllers are equipped between the base transceiver stations 372, 384 and the mobile terminals 370, 386, where the base transceiver station controller provides an appropriate allocation of resources when the user moves from one sector of the base transceiver station to another.

The mobile switching centers 374, 382 perform switching functions for the system and controls calls exchanged with other telephone and data systems. The mobile switching centers 374, 382 identify the received signals to be short messages and transmit the short message data to the short message service center 380, and allow the messages processed at the short message service center 380 to be transferred to the particular mobile subscribers via a suitable base transceiver station.

The signal transfer points 376, 378 are network elements that may be used in IN architectures, where an IN architecture allows IS-41 interconnection over multiple network elements and SS7 (signaling system #7) links.

The short message service center 380 is formed as a combination of hardware and software that transfers and stores short messages exchanged between mobile terminals.

According to an embodiment of the present invention, a message filtering method based on the invention may be performed at the short message service center 380, in which case, the short message service center 380 may comprise a short message filtering module 388 implemented as software or hardware or a combination of both. The short message filtering module 388 performs filtering for the short messages transmitted to the short message center, following a process such as that shown in FIG. 2.

According to another embodiment of the present invention, a message filtering method based on the invention may be performed at the mobile terminals. In this case, a short message is first transmitted to the receiver mobile terminal without filtering, where the short message filtering module equipped on the receiver mobile terminal performs filtering for the short messages received, following a process such as that shown in FIG. 2.

Figure 8:
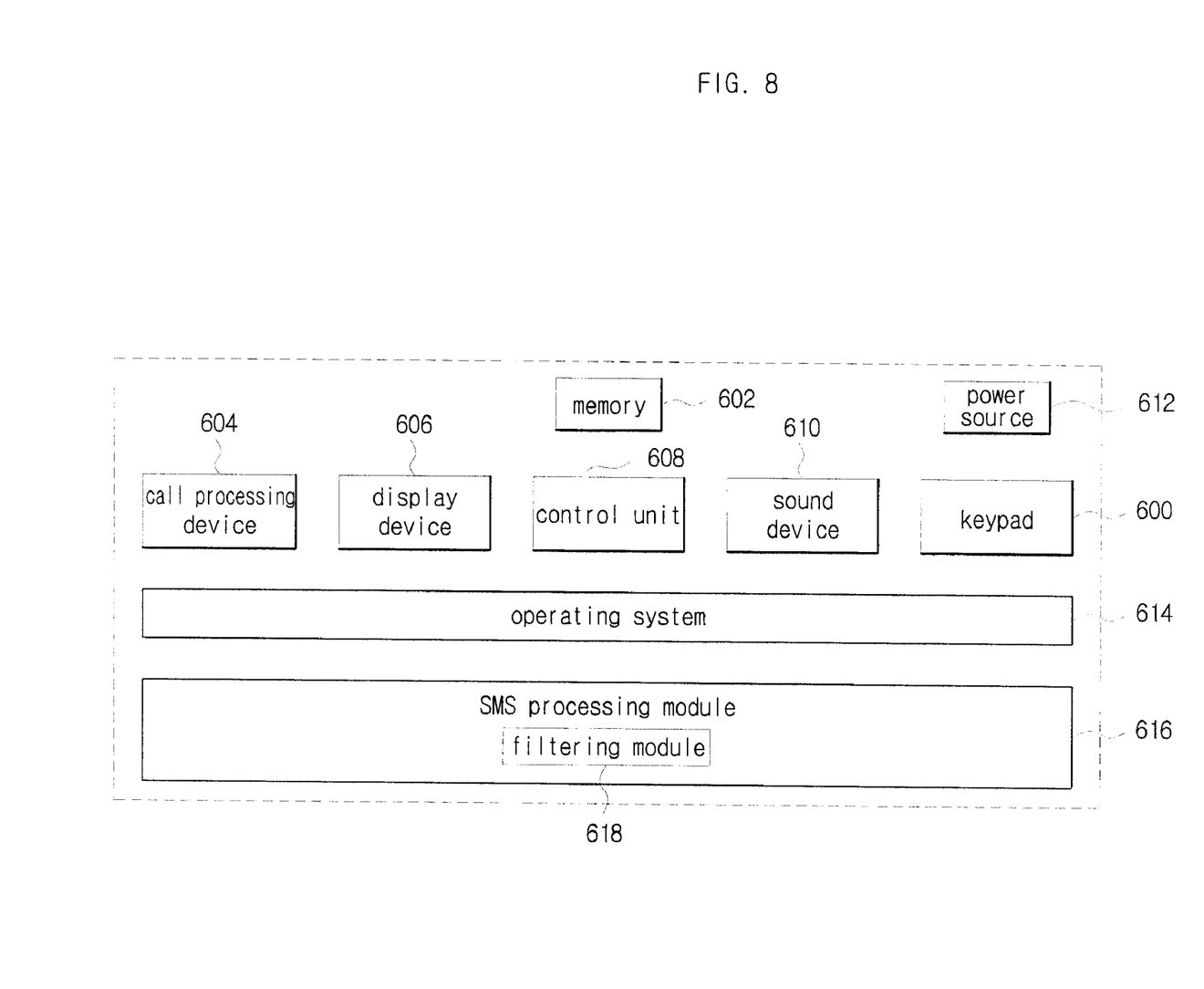
FIG. 8 is a block diagram illustrating the internal structure of a terminal, when a filtering method based on the present invention is performed in a mobile terminal.

FIG. 8 is a block diagram illustrating the internal structure of a terminal, when a filtering method based on the present invention is performed in a mobile terminal.

As illustrated in FIG. 8, a mobile terminal based on an embodiment of the invention may comprise a keypad 600, memory 602, call processing device 604, display device 606, control unit 608, sound device 610, power source 612, operating system 614 and SMS processing module 616.

In FIG. 8, the keypad 600 is formed of a plurality of key buttons (e.g. number buttons, letter buttons, function buttons, etc.), and provides a means for a user to request a search screen display or input a phone number corresponding to a receiver's terminal. The user's key input information inputted through the keypad is transferred to the control unit 608, to enable the operation requested by the user through the keypad.

The memory 602 stores communication related information (e.g. the ESN—electronic serial number—and phone number, etc.) which allows communication services, the user's personal information (e.g. phone number directory and short message transmission data, etc.), and recent call records (i.e. recently dialed phone numbers and recently received phone numbers), etc. The memory 602 may be used in multiples or may be partitioned into multiple storage regions according to the types of information stored. For example, the memory may be divided into a region for storing critical information such as the communication related information, a region for storing information manageable by the user such as the user's personal information including the short messages, and a free storage region which may join with an automated device such as a computer and operate as external memory, etc.

The call processing device 604 processes the transmission of wireless signals, and performs such operations as modulating/demodulating received signals, converting data, and storing processed signals in the memory, etc.

The display device 606 displays on the terminal the information necessary for the use of the mobile terminal, and displays the interface menu, the user's stored information (SMS, phone numbers), and current processing status (connected), etc., using the information stored in the memory 602. The display may be implemented through a variety of display means, and may include LCD's and OLED's, etc.

The sound device 610 outputs pre-stored sounds with the occurrence of particular events. For example, the sound device 610 may detect alarm events, incoming call events, and short message delivery events, etc., and output corresponding sound signals.

The operating system 614 provides an operation system for processing data in the terminal, and numerous operating systems currently known may be used.

The SMS processing module 616 processes the transmission and receipt of short messages in cooperation with the operating system 614. However, unlike the system in FIG. 8, the SMS processing module 616 may independently process short messages without cooperation with the operating system.

As regards transmitting a short message, the SMS processing module 616 provides an interface by which the user may edit a short message, and converts the edited short message to a wireless signal for dispatch.

As regards receiving a short message, the SMS processing module 616 converts the received short message and stores it in the memory.

The control unit 608 cooperates with each module illustrated in FIG. 8 to control the overall operation of the mobile terminal.

The short message filtering module 618 may, as illustrated in FIG. 8, be equipped within the SMS processing module to perform a process such as that shown FIG. 2 for the received message.

Figure 9:
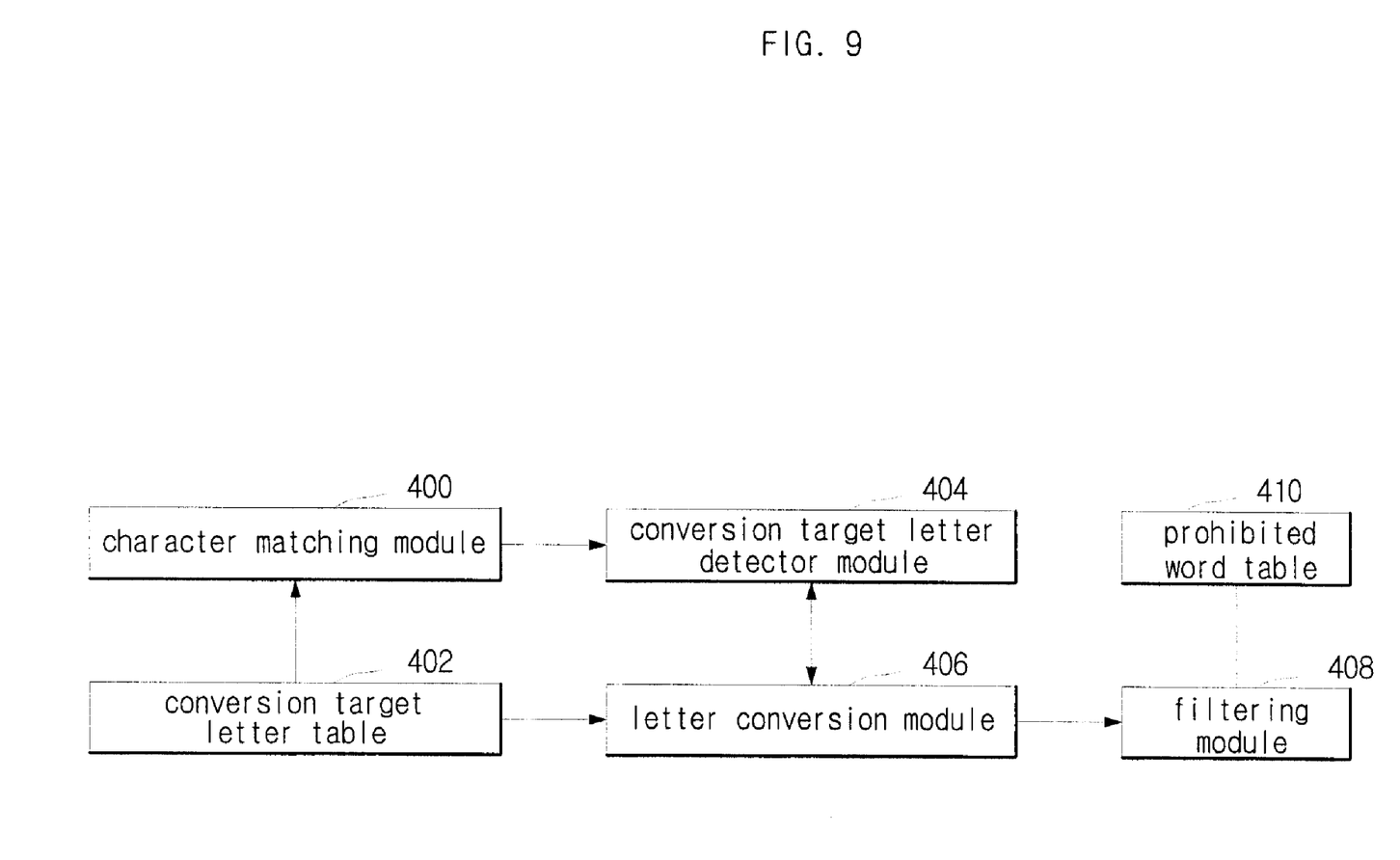
FIG. 9 is a block diagram illustrating the structure of a message filtering module based on a preferred embodiment of the present invention.

FIG. 9 is a block diagram illustrating the structure of a message filtering module based on a preferred embodiment of the present invention.

As illustrated in FIG. 9, a message filtering module according to a preferred embodiment of the invention may comprise a character matching module 400, a conversion target letter table 402, a conversion target letter detector module 404, a letter conversion module 406, a filtering module 408, and a prohibited word table 410.

The conversion target letter table 402 stores letter information regarding letters that need conversion and the hex code information of each letter.

The following table 1 shows an example of a conversion target letter table that may be used when the language is English.

TABLE 1

|  | conversion letter | conversion target letter | | |
|---|---|---|---|---|
| letter | O | ∧ | ⊚ | (o) |
| HEX | 4F | A4C3 | A8 DB | A9 DB |

Referring to Table 1, those letters such as '∧', '⊚', and '(o)', etc., that can be used to elude the alphabet letter 'O' in English are stored in the conversion target letter table, together with the hex code information of each letter. Of course, a greater variety of letters can be used to elude the alphabet letter 'O', and it will be apparent to the skilled person that these letters may be added to the table. Further, the information that such letters as '∧', '⊚', and '(o)', etc. are to be converted to the alphabet letter 'O' is also included in the conversion target letter table.

The following Table 2 shows an example of a conversion target letter table that may be used when the language is Japanese.

TABLE 2

|  | conversion letter | | conversion target letter | |
|---|---|---|---|---|
| letter | お | O | お | 0 |
| HEX | AA AA | 4F | AA A9 | 30 |

Referring to Table 2, those letters such as 'O', 'お', and '0', etc., that can be used to elude the alphabet letter 'お' in Japanese are stored in the conversion target letter table, together with the hex code information of each letter.

The character matching module 400 compares the hex codes of the text contained in the message with the hex codes of the special characters included in the conversion target letter table 402. The character matching module 400 simply performs matching for the hex codes of the message and the hex codes in the conversion target letter table, and does not perform AI-related processes such as string matching.

The conversion target letter detector module 404 determines, from the results of character matching, whether or not there is a hex code in the message that corresponds to a letter in the conversion target letter table, and calls the letter conversion module 406 when a conversion target letter is included in the message.

When the conversion target letter detector module 404 finds that a letter corresponding to the conversion target letter table is included, the letter conversion module 406 converts the corresponding letter using the conversion target letter table. As described above, if '⊚' is included in the conversion target letter table, and the letter to be converted to in the conversion target letter table is 'O', then '⊚' is converted to 'O'.

The filtering module 408 performs keyword filtering for the message converted by the letter conversion module 406. The filtering module 408 determines whether or not there is a word in the converted message that exists in the prohibited word table. The filtering module 408 may perform the keyword filtering using typical string matching procedures, or may employ various other filtering methods. If the results indicate that a prohibited word is included in the message, the filtering module 408 performs filtering for the corresponding message. For example, if the message is a memo message, the filtering module 408 blocks the operation of storing the corresponding message in the database. Also, if the message is a mail message, the filtering module 408 does not store the corresponding mail in the mail box or stores it in the spam mail folder of the mail box.

Figure 10:
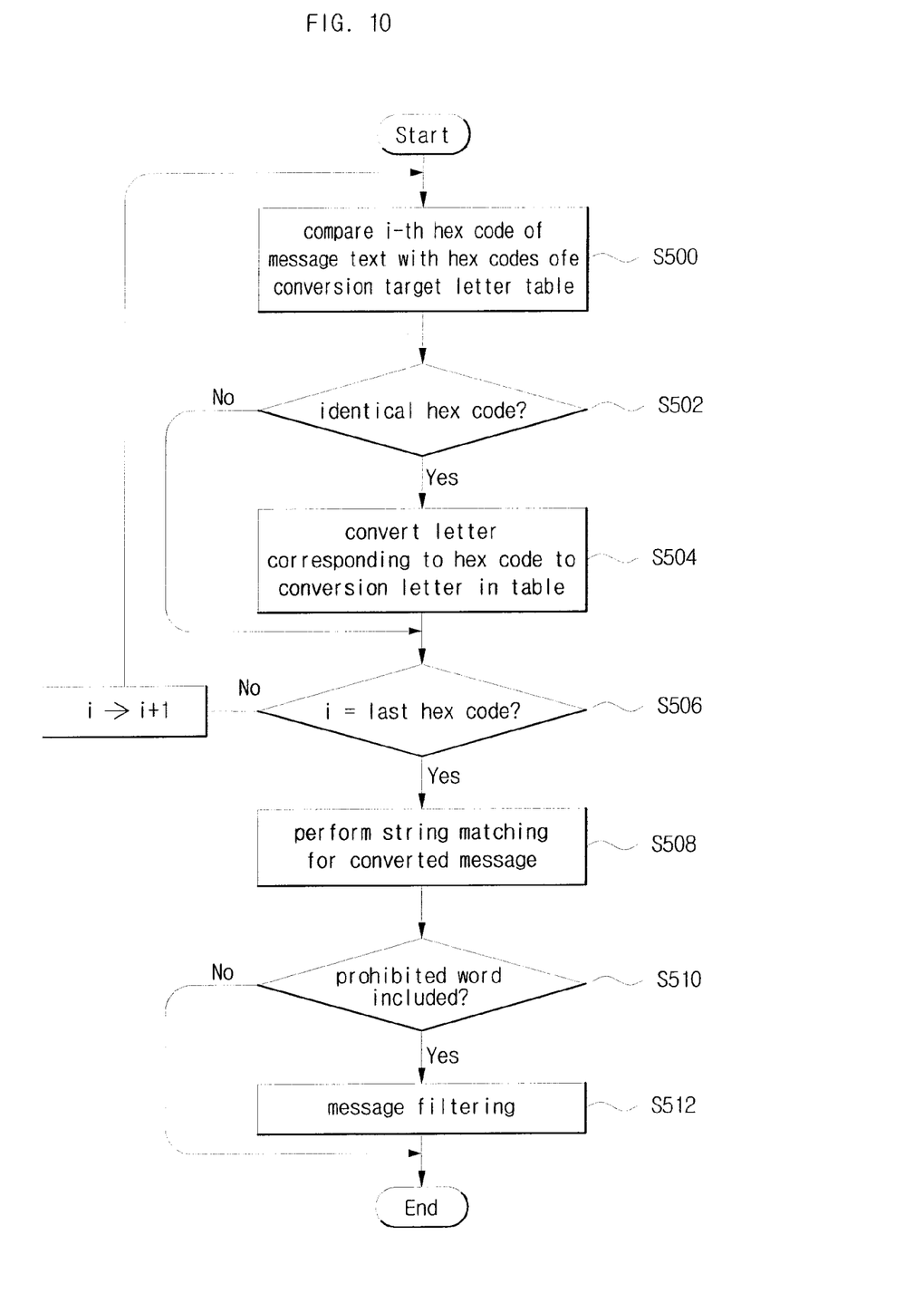
FIG. 10 is a flowchart illustrating in detail a message filtering method based on a preferred embodiment of the present invention.

FIG. 10 is a flowchart illustrating in detail a message filtering method based on a preferred embodiment of the present invention.

Referring to FIG. 10, the procedure is performed where the i-th hex code of the message inputted by the user is compared with the hex codes included in the conversion target letter table, and it is determined whether or not there are identical hex codes (step 500). For example, a comparison method may be used which performs 1:1 matching between the i-th hex code and each hex code of the conversion target letter table.

If the i-th hex code of the message matches one of the hex codes included in the table, the letter corresponding to the hex code is converted to the letter indicated in the conversion letter table (step 504). As described above, if the i-th hex code is a hex code corresponding to '⊚', the hex code corresponding to '⊚' is included in the conversion target letter table, and the information is stored in the table that '⊚' is to be converted to the alphabet letter 'o', then '⊚' is converted to the alphabet letter 'o'. Such conversion methods may be used not only for English but also for a variety of languages as illustrated in the description of FIG. 2.

After the procedures of steps 500 to 504 are performed for the i-th hex code, it is checked whether or not the hex code is the last hex code of the message (step 506).

If it is not the last hex code, steps 500 to 504 are performed for the next (the i+1 th) hex code of the message.

When steps 500 to 504 are performed for all hex codes of the message, all of the letters in the message that are conversion targets are converted. String matching is then performed for the converted message with prohibited words (step 508). For example, if a prohibited word is 'money', string matching is performed for 'money'.

If the results of the string matching indicate that there is a letter sequence identical to a prohibited word (step 510), the corresponding message is filtered (step 512).

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

INDUSTRIAL AVAILABILITY

According to preferred embodiments of the invention as set forth above, a message may effectively be filtered even when the message has been composed to elude string matching filtering using special characters, etc.

The invention claimed is:

1. A method of filtering messages, comprising the steps of:
(a) generating a conversion target letter table storing hex code information corresponding to each conversion target letter that may be used for eluding filtering and conversion letters corresponding to each of the conversion target letters;
(b) comparing a hex code of a letter of a message text inputted by a user with the hex code information stored in the conversion target letter table;
(c) when the hex code matches any one of the hex code information stored in the conversion target letter table, converting the letter to the corresponding conversion letter stored in the conversion target letter table;
(d) repeating the steps (b) and (c) for all of letters of the message text so as to create a converted message text; and
(e) when a pre-configured prohibited word or words are included in the converted message text, filtering the converted message text.

2. The method of claim 1, wherein the message text includes at least one selected from the group consisting of a memo message, an instant message, a mail message, and a message post for a bulletin board.

3. The method of claim 1, wherein the letters for eluding filtering stored in the conversion target letter table include at least one selected from the group consisting of symbols, phonetic signs, and loanwords.

4. The method of claim 1, wherein the step (e) comprises performing string matching to determine whether or not a prohibited word or words are included in the converted message text.

5. The method of claim 1, wherein the filtering comprises blocking the transmission of the message text to a specified user, when the message text is a memo message, an instant message or a mail message.

6. The method of claim 1, wherein the filtering comprises blocking the registration of the message text on a bulletin board, when the message text is a message post.

7. The method of claim 1, wherein when the message text is a mail message, the steps (b) and (c) are performed on title or content of the mail message,
and the filtering further comprises blocking storage of the mail message in a mail box or storing the mail message in a spam mail folder.

8. A message filtering system, comprising:
a conversion target letter table for storing hex code information corresponding to each conversion target letter that may be used for eluding filtering and conversion letters corresponding to each of the conversion target letters;
a character matching module for comparing a hex code of letter of a message text inputted by a user with the hex code information stored in the conversion target letter table;
a letter conversion module for converting, when the hex code matches any one of the hex code information stored in the conversion target letter table, the letter to the corresponding conversion letter stored in the conversion target letter table so as to create a converted message text; and
a filtering module for filtering, when a pre-configured prohibited word or words are included in the converted message text, the converted message text.

9. The message filtering system of claim 8, wherein the message text includes at least one selected from the group consisting of a memo message, an instant message, a mail message, and a message post for a bulletin board.

10. The message filtering system of claim 8, wherein the letters for eluding filtering stored in the conversion target letter table include at least one selected from the group consisting of symbols, phonetic signs, and loanwords.

11. The message filtering system of claim 8, wherein the filtering module performs string matching to determine whether or not a prohibited word or words are included in the converted message text.

12. A mobile terminal for performing filtering of short messages edited using special characters, comprising:
a conversion target letter table for storing hex code information corresponding to each conversion target letter that may be used for eluding filtering and conversion letters corresponding to each of the conversion target letters;
a character matching module for comparing a hex code of a letter of a message text inputted by a user with the hex code information stored in the conversion target letter table;
a letter conversion module for converting, when the hex code matches any one of the hex code information stored in the conversion target letter table, the letter to the corresponding conversion letter stored in the conversion target letter table so as to create a converted message text; and a filtering module or filtering, when a pre-configured prohibited word or words are included in the converted message text, the converted message text.

13. A method of filtering short messages in a mobile communication system at a short message service center, comprising the steps of:

(a) generating a conversion target letter table storing hex code information corresponding to each conversion target letter that may be used for eluding filtering and conversion letters corresponding to each of the conversion target letters;

(b) comparing a hex code of a letter of a message text inputted by a user with the hex code information stored in the conversion target letter table;

(c) when the hex code matches any one of the hex code information stored in the conversion target letter table, converting the letter to the corresponding conversion letter stored in the conversion target letter table;

(d) repeating the steps (b) and (c) for all of letters of the message text so as to create a converted message text; and (e) when a pre-configured prohibited word or words are included in the converted message text, filtering the converted message text.

* * * * *